United States Patent [19]

Naimpally et al.

[11] Patent Number: 4,494,146
[45] Date of Patent: Jan. 15, 1985

[54] WIDEBAND KINESCOPE DRIVER AMPLIFIER

[75] Inventors: Saiprasad V. Naimpally, Indianapolis; James C. Tallant, II, Hamilton, both of Ind.

[73] Assignee: RCA Corporation, New York, N.Y.

[21] Appl. No.: 515,851

[22] Filed: Jul. 21, 1983

[51] Int. Cl.³ .................... H04N 5/14; H04N 5/68; H03K 5/00
[52] U.S. Cl. .................... 358/184; 358/65; 358/242; 330/265
[58] Field of Search .................... 358/184, 65, 64, 74, 358/242, 243, 245; 330/262, 263, 265, 270, 271, 299, 76; 455/341

[56] References Cited

U.S. PATENT DOCUMENTS

| | | | |
|---|---|---|---|
| 3,823,264 | 7/1974 | Haferl | 178/7.5 |
| 4,079,337 | 3/1978 | Lundgren et al. | 330/307 |
| 4,118,731 | 10/1978 | Hinn | 358/65 |
| 4,184,176 | 1/1980 | Sahara | 358/184 |

*Primary Examiner*—Tommy P. Chin
*Attorney, Agent, or Firm*—Eugene M. Whitacre; Paul J. Rasmussen; Ronald H. Kurdyla

[57] ABSTRACT

A kinescope driver amplifier comprises a resistive feedback network coupled from the output to the input of the amplifier. The feedback network includes first and second series resistor of mutually different values. The larger value resistor is connected to amplifier output, and the smaller value resistor is connected to the amplifier input.

8 Claims, 3 Drawing Figures

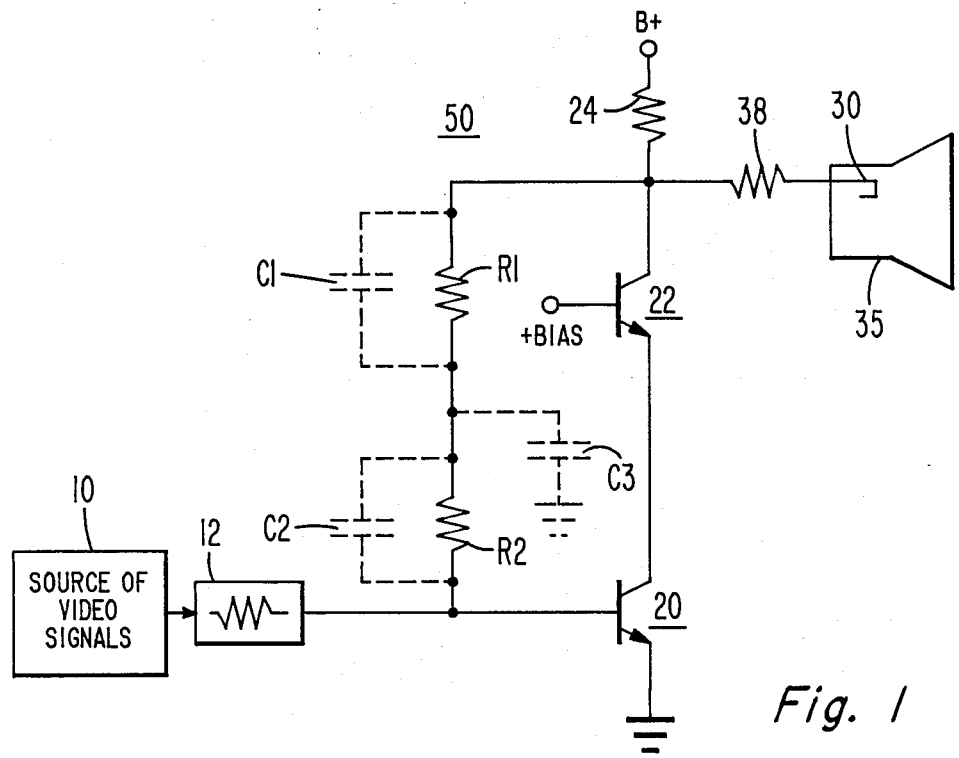
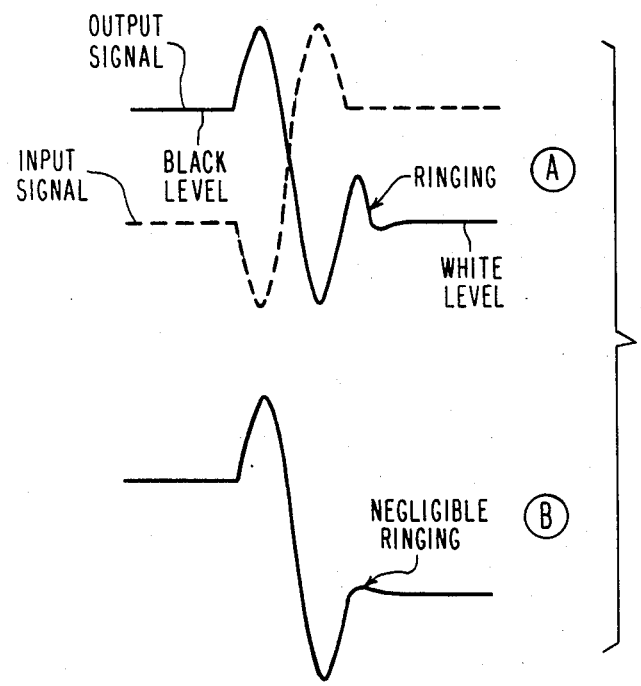
Fig. 1
Fig. 3

WIDEBAND KINESCOPE DRIVER AMPLIFIER

This invention concerns a kinescope driver amplifier for supplying high level video output signals to an image reproducing device such as a kinescope in a television receiver. In particular, the invention concerns a driver amplifier with a degenerative feedback network including resistance elements located for producing increased amplifier bandwidth and high frequency response.

Video driver amplifiers with an associated degenerative feedback network are often used to supply high level video signals to intensity control electrodes (e.g., cathodes) of a kinescope in a television receiver. The feedback network assists to establish the signal gain of the amplifier, and to stabilize the DC operating voltage at the amplifier output. The feedback network also serves to reduce the amplifier output impedance, thereby improving the amplifier bandwidth and high frequency response by reducing the bandwidth limiting effect of parasitic capacitances associated with the output circuit of the amplifier. A further improvement in amplifier high frequency response can be produced by employing one or more "peaking coils" in the output circuit of the amplifier. However, the use of high frequency peaking coils in the amplifier output circuit is considered to be undesirable because of the added circuit cost and complexity introduced by the use of such elements.

It is herein recognized that the high frequency response of a kinescope driver amplifier can be compromised by the effects of parasitic capacitances associated with the output circuit of the amplifier in combination with parasitic capacitances associated with resistors included in the feedback network.

In accordance with the principles of the present invention, the high frequency response of the driver amplifier is increased by utilizing plural feedback resistors coupled in series from the output to the input of the amplifier. The total resistance value of the plural resistors substantially equals the value of a single resistor which would otherwise be required to establish the desired signal gain of the amplifier. It has been found that if the plural resistors are of mutually unequal value, with the largest value resistor being connected directly to the output of the amplifier, the high frequency response of the amplifier can be increased significantly without the generation of significant undesirable ringing in the amplified output signal.

In the drawing:

FIG. 1 shows a portion of a television receiver including a kinescope driver amplifier with an associated feedback resistance network according to the present invention;

FIG. 3 depicts signal waveforms helpful in understanding the response of an amplifier according to the invention.

Figure 2:
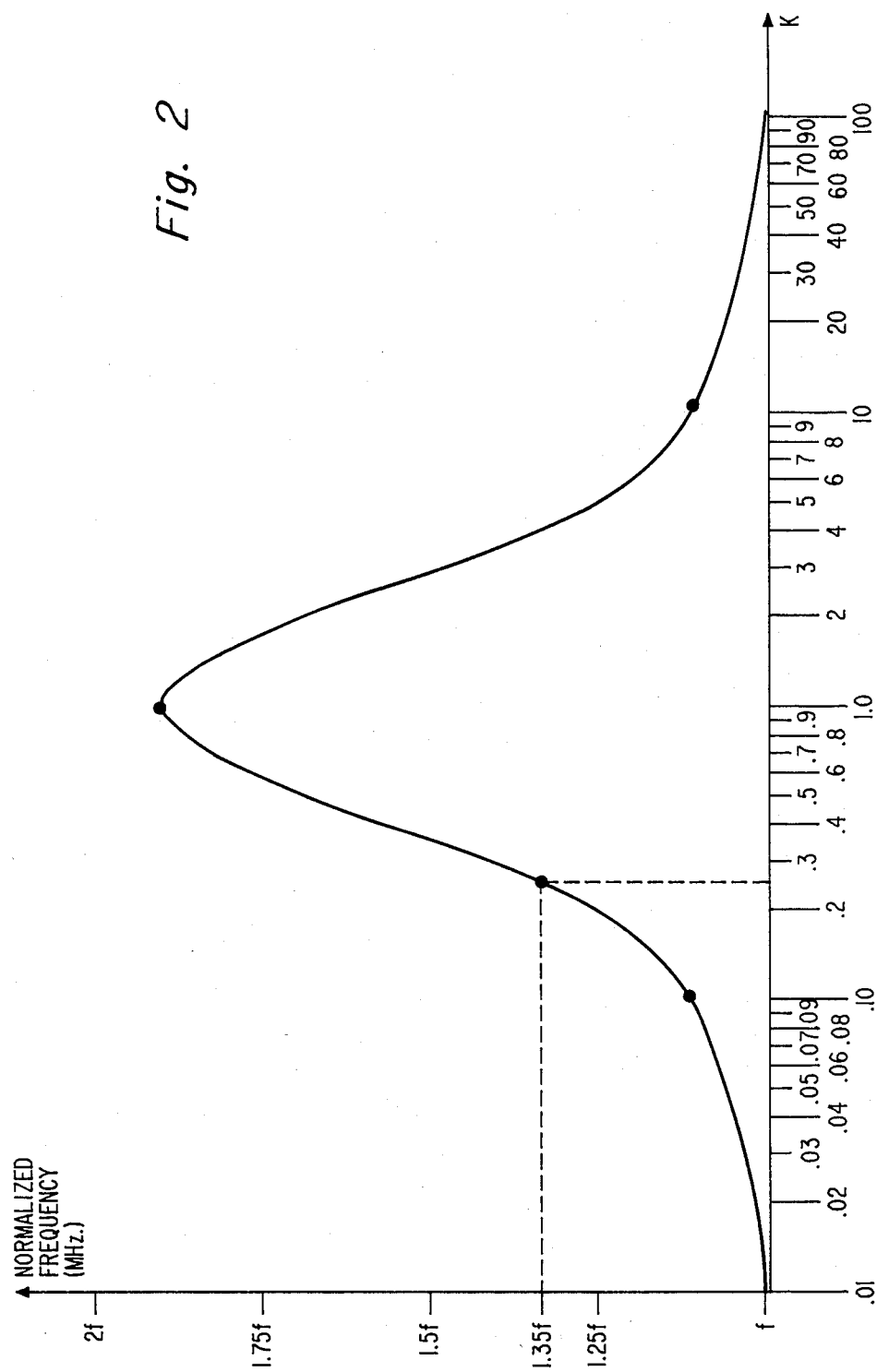
FIG. 2 shows a diagram illustrative of an aspect of an amplifier according to the invention.

In FIG. 1, video signals from a source 10 are coupled to a kinescope driver amplifier via an input signal path including an input signal coupling network 12. The kinescope driver amplifier comprises a cascode amplifier including transistors 20 and 22. Input amplifier transistor 20 is configured as a common emitter amplifier stage, and output amplifier transistor 22 is configured as a common base amplifier stage. Amplified video signals are developed across a load resistor 24 (e.g., 12 kilohms) in the collector output circuit of transistor 22, and are applied to a cathode image intensity control electrode 30 of an image reproducing kinescope 35 via an output signal path including a current limiting resistor 38 (e.g., 2.2 kilohms). Resistor 38 acts as a protection device to prevent the kinescope driver amplifier from being damaged by high voltage transients produced by kinescope arcing. An operating supply voltage for the kinescope driver stage is provided by a DC voltage source B+ (e.g., +230 volts). In the case of a color television receiver, three kinescope driver amplifiers would be required for respectively coupling red, green and blue color image representative video signals to associated cathode electrodes of the color kinescope. The video signals amplified by kinescope driver 20, 22, as derived from a composite broadcast television signal, encompass a frequency bandwidth of from zero Hertz to approximately 4 MHz.

Degenerative feedback for the kinescope driver amplifier is provided by means of a resistive network 50 comprising resistors R1 and R2 serially coupled from the video signal collector output of transistor 22 to the video signal input coupling path at the base input of transistor 20. The base input of transistor 20 represents a virtual ground point, i.e., the quiescent base potential of transistor 20 corresponds to a relatively small, fixed potential equal to the sum of ground potential at the emitter of transistor 20 plus the substantially constant +0.7 volt base-emitter junction offset voltage of transistor 20.

The signal gain of amplifier 20, 22 is determined by the ratio of the sum of the values of feedback resistors R1 and R2 to the value of the input impedance (e.g., 3 kilohms) presented by input coupling network 12 to the input of amplifier transistor 20. The value of such input impedance, which represents an output load for signal source 10, should be high enough to prevent the output circuits of source 10 from conducting excessive currents with attendant excessive power dissipation. This consideration is particularly important when video signal source 10 corresponds to an integrated circuit device, since excessive current conduction and power dissipation is wasteful and can produce potentially destructive thermal stress in an integrated circuit device. In this example the feedback resistance determined by the sum of the values of resistors R1 and R2 is on the order of 160 kilohms, which produces an amplifier signal voltage gain of approximately 54. Relatively larger values of feedback resistance also advantageously assist to reduce the power consumption of the driver amplifier.

The desired amplifier signal gain can also be produced by employing a single feedback resistor (e.g., a 160 kilohm, ½ watt, carbon film device) in place of plural resistors R1 and R2. However, it has been found that significantly increased amplifier high frequency response results when plural (e.g., two) resistors are used to replace the single feedback resistor. In the case of a single resistor feedback network, parasitic capacitances are more effective to undesirably limit the high frequency response of the amplifier. The increased high frequency response resulting from the use of plural feedback resistors can, however, have associated therewith unwanted characteristics such as "ringing" associated with amplitude transitions in the amplified signal. A wide bandwidth is desirable in many video signal processing applications since it promotes enhanced definition of a reproduced video image. The "ringing"

which may be encountered in a wideband amplifier system undesirably degrades the otherwise good image definition afforded by wideband signal processing. The visible effect of such signal ringing in a displayed image resembles a "ghosting" or "striped" effect along the edges of image transitions.

Resistors R1 and R2 of feedback network 50 are located in a manner which results in a significant improvement in the high frequency response of kinescope driver amplifier 20,22, and which virtually eliminates the image distorting effects of ringing in the amplifier output signal. This is accomplished by employing plural feedback resistors R1 and R2 of different values, and by locating the resistor with the larger value (R1) nearest to the output circuit of output transistor 22. In this embodiment resistor R1 corresponds to a ½ watt carbon film device with a value of 130 kilohms, and resistor R2 corresponds to a ¼ watt carbon film device with a value of 33 kilohms.

An explanation of the manner in which the aforementioned result is accomplished will now be provided.

Parasitic capacitances of several types affect the frequency response of feedback network 50. Among the more significant of these parasitic capacitances are C1, C2 and C3 as shown in FIG. 1. Capacitance C1 comprises the parasitic capacitance associated with resistor R1 itself (approximately 0.3 pf for a ½ watt device), together with any stray connector and wiring capacitances which may appear between circuit connectors at the collector of transistor 22 and circuit connectors at the junction of resistors R1 and R2. Capacitance C2 comprises the parasitic capacitance associated with resistor R2 itself (approximately 0.2 pf for a ¼ watt device), together with any associated stray connector and wiring capacitances. Capacitance C3 comprises a parasitic capacitance to ground associated with the circuit connections at the junction of resistors R1 and R2. The values of these parasitic capacitances are influenced, for example, by the type of circuit connections utilized and by circuit layout (e.g., with respect to points of ground potential, and physical proximity of circuit elements).

The values of such parasitic capacitances are difficult to determine or measure accurately in many cases, but can sometimes be estimated with acceptable accuracy. In this example capacitance C1 is noticeably greater than capacitance C2 because resistor R2 is a physically larger ½ watt device compared to ¼ watt resistor R2, and because considerable parasitic capacitance appears at the collector of output transistor 22. In the latter regard it is noted that amplifier load resistor 24 is typically a relatively large (e.g., 2 watt or greater) power resistor with correspondingly sized connecting hardware which may include means for raising resistor 24 above an associated printed circuit board for better heat dissipation. Such connecting hardware adds a significant component to parasitic capacitance C1. Also a factor here is the manner in which the collector of transistor 22 and resistors 24, 38 and R1 are interconnected and positioned. It has also been found that the values of capacitances C1 and C2 are relatively independent of the resistance values of respective resistors R1 and R2.

As mentioned previously, the high frequency response of a kinescope driver amplifier can be improved by using two feedback resistors rather than one. To illustrate this effect graphically in a general sense, FIG. 2 shows the approximate high frequency response capability for the driver amplifier, at the high frequency −3 db point, for various combinations of feedback resistor values. For purposes of simplicity ¼ watt resistors with an associated parasitic capacitance of 0.2 picofarads are assumed, and other stray capacitance effects are neglected. In FIG. 2 the horizontal axis designates a ratio K, from 0.01 to 100, between the values of the feedback resistors. The vertical axis designates a normalized amplifier high frequency response relative to a reference high frequency "f" (e.g., on the order of 4 MHz). A maximum high frequency response (corresponding to the upper frequency limit at the −3 db point) of between 1.75 f and 2 f is associated with a resistor ratio K=1, corresponding to two equal value feedback resistors, e.g., two ¼ watt, 82 kilohm devices. A minimum high frequency response is associated with resistor ratios in the vicinity of K=0.01 and K=100. This condition corresponds to the use of a single 160 kilohm feedback resistor. Thus improved high frequency response can be obtained by employing two feedback resistors rather than one, particularly when the values of such resistors exhibit a ratio between 1:10 (K=0.1) and 10:1 (K=10). Illustratively, in a general sense an upper frequency limit of 1.35 f (e.g., 5.4 MHz relative to a reference frequency f of 4 MHz) can be expected when the two feedback resistors exhibit values corresponding to a ratio of K=0.25.

However, it has been found that when two equal value feedback resistors are employed to achieve maximum amplifier high frequency response, "ringing" of the amplifier output signal results as indicated by waveform A in FIG. 3. Waveform A corresponds to the output signal from the kinescope driver amplifier produced in response to an amplifier input signal shown in phantom outline form. The input signal and corresponding output signal A comprise a peaked black-to-white level amplitude transition with peaking provided by pre-shoot and over-shoot signal components. Associated with the white level of output signal A is an unwanted ringing component which degrades the quality and detail of an image reproduced in response to output signal A. Ringing components with large amplitudes encompassing 40% of the black level to white level video signal amplitude transition have been observed.

It has been found that reducing the high frequency response of the kinescope driver amplifier from the maximum high frequency limit (2 f in FIG. 2) by altering the resistance ratio K between the feedback resistors does not alleviate the ringing problem when the smaller 33 kilohm resistor is located nearest to the amplifier output. Specifically, when a 33 kilohm ¼ watt resistor is selected for feedback resistor R1 in FIG. 1, and a 130 kilohm ½ watt resistor is selected for resistor R2, a ringing component with an amplitude of approximately 25% of the video signal transition was present.

However, it has been found that the amplitude of the ringing component is significantly reduced when the larger resistor is located nearest to the amplifier output, i.e., when R1 shown in FIG. 1 corresponds to the 130 kilohm resistor. In such case the ringing component was found to exhibit a negligible amplitude of less than 10% of the video signal black level to white level transition, as indicated by waveform B in FIG. 3.

In connection with the above it is noted that the signal gain of the driver amplifier can be defined by the following expression in the complex frequency (or "S" plane):

$$\frac{-1}{R1N}\left(\frac{C1+C2+C3}{C1C2}\right) \frac{S + \frac{1}{Rp(C1+C2+C3)}}{\left(S + \frac{1}{R1C1}\right)\left(S + \frac{1}{R2C2}\right)}$$

where
- R1N is the input impedance presented to input transistor 20;
- R1, R2 respectively correspond to the values of resistors R1 and R2;
- C1, C2, C3 respectively correspond to the values of capacitances C1, C2 and C3;
- Rp corresponds to the parallel combination of resistors R1 and R2; and
- S corresponds to j2πf where "f" corresponds to frequency.

In this expression the terms
S+(1/R1C1) and S+(1/R2C2)
each define a separate "pole" frequency location from which the frequency response decreases at −6 db/octave. The term $$S + \frac{1}{Rp(C1 + C2 + C3)}$$

defines a single "zero" frequency location from which the frequency response increases at +6 db/octave. Thus the "pole" frequency terms cause a degradation of the amplifier high frequency response, whereas in contrast the "zero" frequency term enhances the amplifier high frequency response and assists to increase the amplifier bandwidth.

For given pole frequency locations, decreasing the "zero" frequency increases the amplifier bandwidth and the high frequency limit at the −3 db point since the increasing "zero" frequency response takes effect sooner, and the amplitude-versus-frequency response of the amplifier is caused to begin increasing sooner (i.e., at a lower frequency). The condition of a maximum bandwidth and high frequency limit at the −3 db point exists when equal value feedback resistors are employed, for in such case Rp is maximum and the associated "zero" frequency is at a minimum.

The amplifier high frequency response can be decreased by causing the increasing "zero" frequency response to take effect later (i.e., at a relatively higher frequency). This effect can be produced by choosing resistors R1 and R2 with mutually different values such that the "zero" frequency in the above expression increases. In this case Rp is no longer a maximum since the parallel combination of R1 and R2 becomes increasingly smaller as these resistors diverge in value. Simply reducing the amplifier high frequency limit in this manner is not sufficient to eliminate the previously described signal "ringing" problem, particularly when the coaction of the increasing "zero" frequency response and the decreasing poles frequency response develops a peak in the high frequency portion of the frequency spectrum (e.g., a peak between 3–4 MHz).

Locating the larger value feedback resistor (R1) nearest to the amplifier output produces a pole frequency in the vicinity of the desired upper frequency range (3–5 MHz) of the amplifier. Consequently such arrangement offsets the peaking characteristic associated with the increasing "zero" frequency response in an amount sufficient to cause a significant reduction in the amplitude of the ringing component.

A kinescope driver amplifier of the type shown in FIG. 1 with resistors R1 and R2 of 130 kilohms and 33 kilohms, respectively, was observed to exhibit a bandwidth of approximately 5.5 MHz with no significant output signal ringing component, as discussed. Resistor ratios of K=0.14 ((for R1=139 kilohms and R2=20 kilohms) to K=0.43 (for R1=110 kilohms and R2=47 kilohms) were found to provide improved driver amplifier bandwidth and high frequency response without introducing objectionable amounts of signal ringing. The ratio K=0.14 produced less ringing but somewhat less bandwidth compared to the selected preferred resistor ratio of K=0.25, while the ratio K=0.43 achieved greater bandwidth with somewhat more signal ringing.

What is claimed is:
1. In a video signal processing system including an image reproducing device for displaying video information in response to video signals supplied thereto from a source of video signals, a driver amplifier stage for supplying said video signals to said image reproducing device comprising:
   an input signal path;
   an amplifier with a signal input for receiving input video signal from said source conveyed via said input signal path, and a signal output from which amplified video signals are provided to said image reproducing device; and
   a degenerative feedback path coupled from said amplifier output to said input signal coupling path, wherein for improving the high frequency response of said amplifier said feedback path includes plural resistors connected in series, said plural resistors coacting with parasitic capacitances associated with the signal output of said amplifier stage and with said feedback path; and wherein
   for reducing the magnitude of an unwanted ringing characteristic associated with said improved high frequency response said plural resistors are selected to exhibit mutually different values with a prescribed mutual ratio, and the one of said plural resistors having a value larger than another of said plural resistors is located nearest to said amplifier output.

2. An amplifier stage according to claim 1, wherein the one of said plural resistors having the largest value is located nearest to said amplifier output.

3. An amplifier stage according to claim 1, wherein said feedback path consists of a first resistor, and a second resistor of smaller value relative to the value of said first resistor, said first and second resistors being coupled in series from said amplifier output to said input signal path such that said first resistor is located nearest to said amplifier output.

4. An amplifier stage according to claim 3, wherein the ratio of the value of said first resistor to the value of said second resistor encompasses a range between 2 to 1 and 10 to 1.

5. An amplifier stage according to claim 1, wherein said amplifier input represents a virtual ground point.

6. An amplifier stage according to claim 1, wherein said plural resistors comprise carbon film resistors.

7. An amplifier stage according to claim 1, wherein said amplifier comprises a cascode amplifier comprising:

a first transistor with a first electrode, and second and third electrodes defining a main current conduction path of said first transistor;

a second transistor with a first electrode, and second and third electrodes defining a main current path for said second transistor;

means for coupling said main current paths of said first and second transistors in series;

means for coupling video signals to be amplified to said first electrode of said first transistor;

means for applying a direct current bias voltage to said first electrode of said second transistor;

means for deriving amplified video signals from said third electrode of said second transistor; and means for coupling said feedback path from said third electrode of said second transistor to said first electrode of said first transistor, said larger value resistor being located nearest to said third electrode of said second transistor.

8. An amplifier stage according to claim 7, wherein said first, second and third electrodes respectively correspond to base, emitter and collector electrodes; and said base electrode of said first transistor represents a virtual ground point.

* * * * *